(12) United States Patent
Liu et al.

(10) Patent No.: US 12,135,673 B2
(45) Date of Patent: Nov. 5, 2024

(54) BASEBOARD MANAGEMENT CONTROLLER AND OPERATION METHOD THEREOF

(71) Applicant: ASPEED Technology Inc., Hsinchu (TW)

(72) Inventors: Hung Liu, Hsinchu (TW); Chih-Chiang Tsao, Hsinchu (TW)

(73) Assignee: ASPEED Technology Inc., Hsinchu (TW)

( * ) Notice: Subject to any disclaimer, the term of this patent is extended or adjusted under 35 U.S.C. 154(b) by 0 days.

(21) Appl. No.: 18/084,523

(22) Filed: Dec. 19, 2022

(65) Prior Publication Data

US 2024/0134816 A1  Apr. 25, 2024
US 2024/0232123 A9  Jul. 11, 2024

(30) Foreign Application Priority Data

Oct. 21, 2022  (TW) .................................. 111139952

(51) Int. Cl.
*G06F 13/42* (2006.01)
*G06F 13/38* (2006.01)

(52) U.S. Cl.
CPC ........ *G06F 13/4282* (2013.01); *G06F 13/382* (2013.01); *G06F 2213/0042* (2013.01)

(58) Field of Classification Search
CPC ............... G06F 13/4282; G06F 13/382; G06F 2213/0042

See application file for complete search history.

(56) References Cited

U.S. PATENT DOCUMENTS 8,069,257 B1    11/2011  Bhatia et al.
2004/0019732 A1*  1/2004  Overtoom ........... G06F 13/4022
                                                710/313

(Continued)

FOREIGN PATENT DOCUMENTS

CN    113608937    11/2021
CN    113626821    11/2021

(Continued)

OTHER PUBLICATIONS

"Office Action of Taiwan Counterpart Application", issued on Sep. 5, 2023, p. 1-p. 7.

(Continued)

*Primary Examiner* — Henry Tsai
*Assistant Examiner* — Harry Z Wang
(74) *Attorney, Agent, or Firm* — JCIPRNET

(57) ABSTRACT

A baseboard management controller (BMC) and an operation method thereof are provided. The BMC includes a path switching circuit, a host interface circuit, a universal serial bus (USB) hub controller, a USB physical layer circuit, and a control circuit. The host interface circuit is adapted to be electrically connected to a host circuit outside the BMC. The USB physical layer circuit is adapted to be electrically connected to an external USB host or an external USB device outside the BMC. The control circuit controls the path switching circuit to selectively couple the host interface circuit to the USB hub controller, selectively couple the USB hub controller to the USB physical layer circuit, or selectively couple the host interface circuit to the USB physical layer circuit.

12 Claims, 11 Drawing Sheets

(56) References Cited

U.S. PATENT DOCUMENTS

| | | | | |
|---|---|---|---|---|
| 2007/0180181 | A1* | 8/2007 | Chen | G06F 13/426 |
| | | | | 710/316 |
| 2015/0220139 | A1* | 8/2015 | Puthillathe | G06F 13/385 |
| | | | | 710/63 |
| 2016/0154759 | A1* | 6/2016 | Kakish | G06F 13/10 |
| | | | | 710/33 |
| 2019/0045654 | A1* | 2/2019 | Abbondanzio | H05K 7/1494 |
| 2019/0052525 | A1* | 2/2019 | Bhesania | H04L 41/0803 |
| 2020/0026678 | A1* | 1/2020 | Kennedy | G06F 13/4022 |

FOREIGN PATENT DOCUMENTS

| | | |
|---|---|---|
| CN | 113760800 | 12/2021 |
| TW | 201433923 | 9/2014 |
| TW | 201502772 | 1/2015 |
| TW | 202225954 | 7/2022 |

OTHER PUBLICATIONS

"Office Action of Taiwan Counterpart Application", issued on May 8, 2023, pp. 1-8.

* cited by examiner

BASEBOARD MANAGEMENT CONTROLLER AND OPERATION METHOD THEREOF

CROSS-REFERENCE TO RELATED APPLICATION

This application claims the priority benefit of Taiwan application Ser. No. 111139952, filed on Oct. 21, 2022. The entirety of the above-mentioned patent application is hereby incorporated by reference herein and made a part of this specification.

BACKGROUND

Technical Field

The invention relates to an integrated circuit, and more particularly, to a baseboard management controller (BMC) and an operation method thereof.

Description of Related Art

A baseboard management controller (BMC) may manage module circuits on a motherboard, so that components on the motherboard may operate smoothly. The BMC may also collect/monitor hardware operation data on the motherboard to determine whether hardware on the motherboard is abnormal. If an abnormality is detected, the BMC may automatically send a warning message to a network management personnel, and the network management personnel may conduct remote diagnosis to eliminate the abnormality.

The BMC may be used in various motherboard environments. For example, on some motherboards, a central processing unit (CPU) may be coupled to a certain BMC through a platform controller hub (PCH); on other motherboards, the CPU may be directly coupled to another BMC. For another example, on some motherboards, a certain BMC may have a universal serial bus (USB) host controller (USB host controller) function to communicate with an external USB device (USB device); on other motherboards, another BMC may have a USB device controller function to communicate with an external USB host (USB host). In any case, the conventional BMC only supports a single configuration. The same conventional BMC cannot be dynamically switched to different configurations (such as free switching between a USB host controller configuration and a USB device controller configuration) along with variation of a hardware signal (such as an identification pin signal (ID pin signal)).

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides a baseboard management controller (BMC) and an operation method thereof, which are adapted to flexibly switch to different configurations to adapt to different application environments.

In an embodiment of the invention, the BMC includes a path switching circuit, a host interface circuit, a universal serial bus (USB) hub controller, a USB physical layer circuit, and a control circuit. The host interface circuit is coupled to the path switching circuit. The host interface circuit is adapted to be electrically connected to a host circuit outside the BMC. The USB hub controller and the USB physical layer circuit are coupled to the path switching circuit. The USB physical layer circuit is adapted to be electrically connected to an external USB host or an external USB device outside the BMC. The control circuit is configured to control the path switching circuit to selectively couple the host interface circuit to the USB hub controller, selectively couple the USB hub controller to the USB physical layer circuit, or selectively couple the host interface circuit to the USB physical layer circuit.

In an embodiment of the invention, an operation method of the BMC includes following. The control circuit of the BMC selects to run a USB host controller driver or a USB device controller driver based on a hardware signal. When the control circuit runs the USB host controller driver, the BMC has a USB host controller function. When the control circuit runs the USB device controller driver, the BMC has a USB device controller function.

Based on the above, the BMC according to the embodiments of the invention is configured with the host interface circuit, the USB hub controller, and the USB physical layer circuit. The path switching circuit may flexibly switch routes among the host interface circuit, the USB hub controller and the USB physical layer circuit. For example, the path switching circuit may selectively provide an internal bus between the host interface circuit and the USB hub controller, so that the USB hub controller may provide the USB hub function to the external host circuit (for example, CPU) through the host interface circuit; the path switching circuit may selectively provide a USB bus between the USB hub controller and the USB physical layer circuit, so that the USB hub controller provides the USB hub function to the external USB host through the USB physical layer circuit; and the path switching circuit may selectively provide the USB bus between the host interface circuit and the USB physical layer circuit, so that the host interface circuit provides the USB host function to the external USB device through the USB physical layer circuit. Therefore, the BMC may be flexibly switched to different configurations to adapt to different application environments.

In order for the aforementioned features and advantages of the disclosure to be more comprehensible, several embodiments accompanied with drawings are described in detail as follows.

DESCRIPTION OF THE EMBODIMENTS

Figure 1:
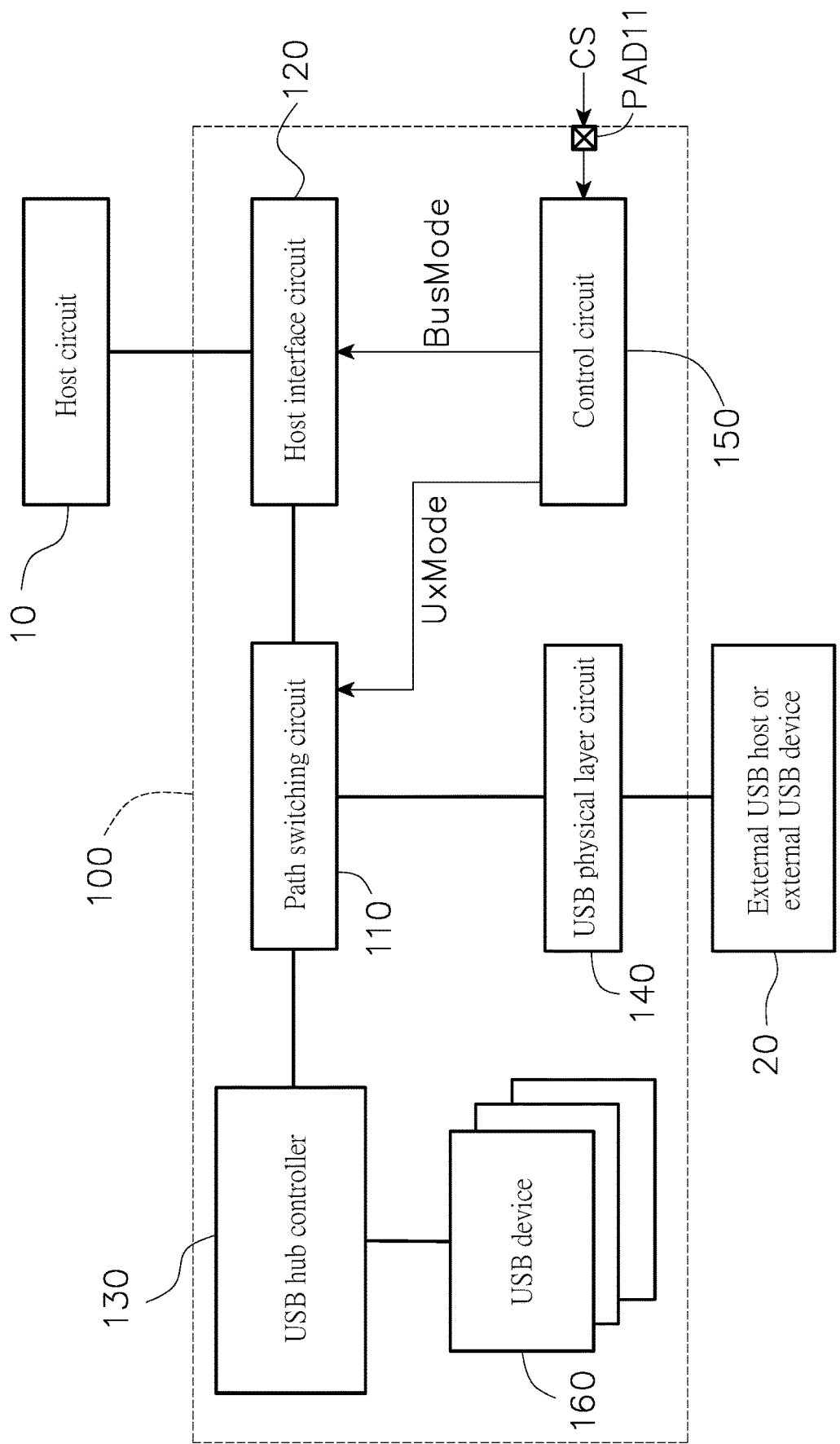
FIG. 1 is a schematic circuit block diagram of a baseboard management controller (BMC) according to an embodiment of the invention.

A term "couple" used in the full text of the disclosure (including the claims) refers to any direct and indirect connections. For example, if a first device is described to be coupled to a second device, it is interpreted as that the first device is directly coupled to the second device, or the first device is indirectly coupled to the second device through other devices or connection means. "First", "second", etc. mentioned in the specification and the claims are merely used to name the elements and should not be regarded as limiting the upper or lower bound of the number of the components/devices, nor is it intended to limit an order of the elements. Moreover, wherever possible, components/members/steps using the same referential numbers in the drawings and description refer to the same or like parts. Components/members/steps using the same referential numbers or using the same terms in different embodiments may cross-refer related descriptions.

FIG. 1 is a schematic circuit block diagram of a baseboard management controller (BMC) 100 according to an embodiment of the invention. The BMC 100 shown in FIG. 1 includes a path switching circuit 110, a host interface circuit 120, a universal serial bus hub controller (USB hub controller) 130, and a USB physical layer (USB PHY) circuit 140 and a control circuit 150. The host interface circuit 120 is adapted to be electrically connected to a host circuit 10 outside the BMC 100. The BMC 100 and the host circuit 10 may be configured on a motherboard. According to practical applications, the host circuit 10 may include a platform controller hub (PCH), a central processing unit (CPU), a chip set, and/or other host circuits.

According to different design requirements, in some embodiments, the path switching circuit 110, the host interface circuit 120, the USB hub controller 130 and/or the control circuit 150 may be implemented as hardware circuits. In other embodiments, the path switching circuit 110, the host interface circuit 120, the USB hub controller 130 and/or the control circuit 150 may be implemented as firmware, software (program) or a combination thereof. In some other embodiments, the path switching circuit 110, the host interface circuit 120, the USB hub controller 130 and/or the control circuit 150 may be implemented as a combination of hardware, firmware and software.

If implemented in terms of hardware, the path switching circuit 110, the host interface circuit 120, the USB hub controller 130 and/or the control circuit 150 may be implemented as logic circuits on an integrated circuit. For example, the related functions of the path switching circuit 110, the host interface circuit 120, the USB hub controller 130 and/or the control circuit 150 may be implemented in one or a plurality of controllers, microcontrollers, microprocessors, application-specific integrated circuits (ASICs), digital signal processors (DSPs), field programmable gate arrays (FPGAs) and/or various logical blocks, modules and circuits in other processing units. The related functions of the path switching circuit 110, the host interface circuit 120, the USB hub controller 130 and/or the control circuit 150 may be implemented as hardware circuits, such as various logic blocks, modules and circuits in an integrated circuit by using hardware description languages (such as Verilog HDL or VHDL) or other suitable programming languages.

If implemented in terms of software and/or firmware, the above-mentioned functions of the path switching circuit 110, the host interface circuit 120, the USB hub controller 130 and/or the control circuit 150 may be implemented as programming codes. For example, the path switching circuit 110, the host interface circuit 120, the USB hub controller 130, and/or the control circuit 150 are implemented by using general programming languages (for example, C, C++, or an assembly language) or other suitable programming languages. The programming codes may be recorded/stored in a "non-transitory computer readable medium". In some embodiments, the non-transitory computer readable medium includes, for example, a semiconductor memory and/or a storage device. The semiconductor memory includes a memory card, a read only memory (ROM), a flash memory, a programmable logic circuit or other semiconductor memories. The storage device includes a tape, a disk, a hard disk drive (HDD), a solid-state drive (SSD), or other storage devices. An electronic device (such as a CPU, a controller, a microcontroller or a microprocessor) may read and execute the programming codes from the non-transitory computer-readable medium, thereby implementing the related functions of the path switching circuit 110, the host interface circuit 120, the USB hub controller 130 and/or the control circuit 150.

The embodiment does not limit an implementation of the host interface circuit 120. For example, according to an actual design, the host interface circuit 120 may include an eXtensible host controller interface (xHCI), and the host interface circuit 120 may be electrically connected to the host circuit 10 through a peripheral component interconnect express (PCIe) bus. The control circuit 150 may control the host interface circuit 120 through a control signal BusMode to selectively switch a bus mode of the host interface circuit 120. For example (but not limited to), the control circuit 150 may control the host interface circuit 120 to selectively operate in a BMC xHCI mode or a PCIe xHCI mode.

The USB hub controller 130 is adapted to be coupled to one or a plurality of USB devices 160. Based on an actual design, the USB device 160 may include a physical USB device and/or a virtual USB device. The USB physical layer circuit 140 is adapted to be electrically connected to an external USB host or an external USB device 20 outside the BMC 100. The path switching circuit 110 is coupled between the host interface circuit 120, the USB hub controller 130 and the USB physical layer circuit 140. The control circuit 150 may control the path switching circuit 110 through a control signal UxMode, so as to selectively couple the host interface circuit 120 to the USB hub controller 130, or selectively couple the USB hub controller 130 to the USB physical layer circuit 140, or selectively couple the host interface circuit 120 to the USB physical layer circuit 140.

For example, when the BMC 100 operates in an "internal bus mode", the control circuit 150 may control the path switching circuit 110 to provide an internal bus between the host interface circuit 120 and the USB hub controller 130, so that the USB hub controller 130 provides a USB hub function to the host circuit 10 through the path switching circuit 110 and the host interface circuit 120. When the BMC 100 operates in a "USB device mode", the control circuit 150 may control the path switching circuit 110 to provide a USB bus between the USB hub controller 130 and the USB physical layer circuit 140, so that the USB hub controller 130 may provide a USB hub function to the external USB host 20 through the path switching circuit 110 and the USB physical layer circuit 140. When the BMC 100 operates in a "USB host mode", the control circuit 150 may control the path switching circuit 110 to provide the USB bus between the host interface circuit 120 and the USB physical layer circuit 140, so that the host interface circuit 120 may provide a USB host function to the external USB device 20 through the path switching circuit 110 and the USB physical layer circuit 140.

In some embodiments, the control circuit 150 can dynamically change the control signal UxMode according to current operating environment conditions (for example, user setting parameters and/or manufacturer setting parameters of the system), thereby dynamically changing a routing configuration of the path switching circuit 110. In other embodiments, the control circuit 150 may dynamically change the control signal UxMode based on a hardware signal CS. The control circuit 150 may receive the hardware signal CS (for example, an ID pin signal) through a connection pad PAD11. According to a change of the hardware signal CS, the control circuit 150 may dynamically change the control signal UxMode, so as to dynamically switch between different routing configurations of the path switching circuit 110.

Figure 2:
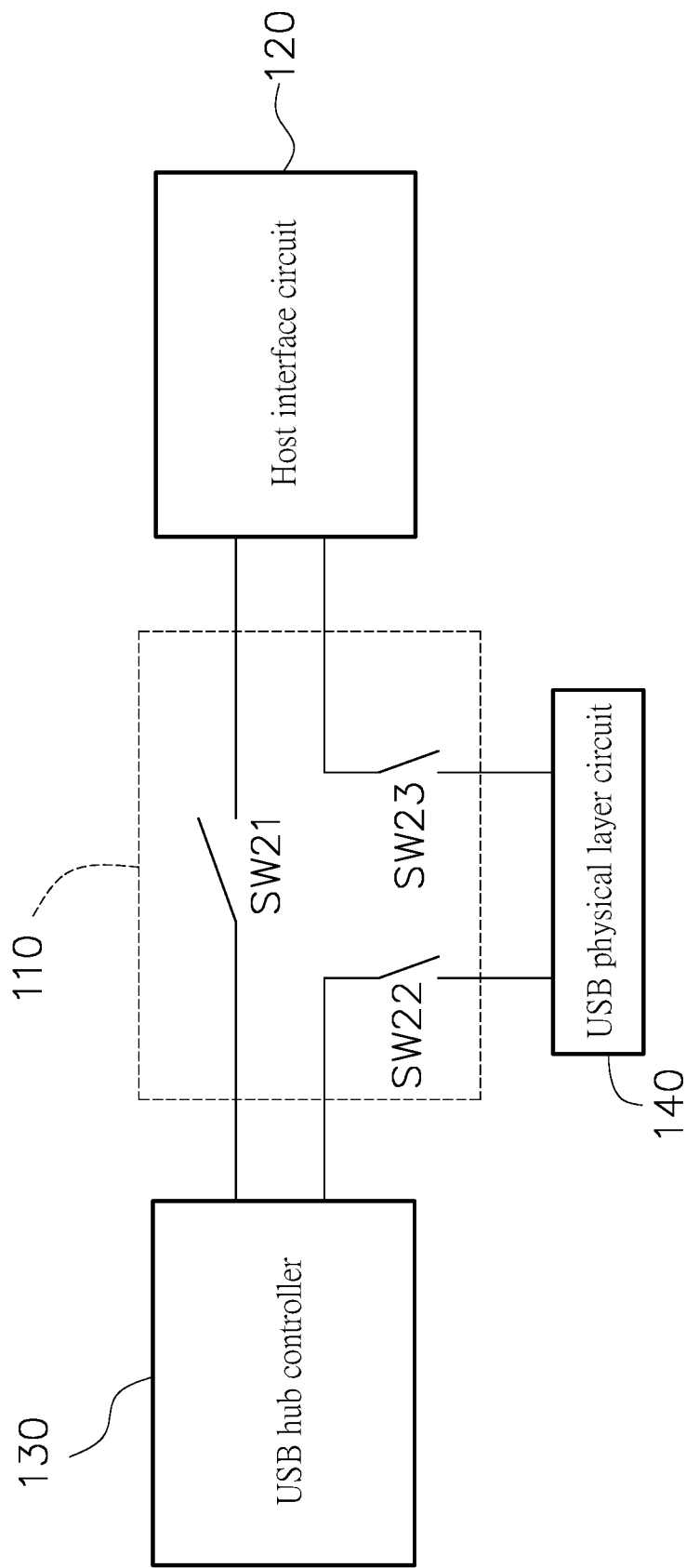
FIG. 2 is a schematic circuit diagram of a path switching circuit according to an embodiment of the invention.

FIG. 2 is a schematic circuit diagram of a path switching circuit 110 according to an embodiment of the invention. The path switching circuit 110 shown in FIG. 2 includes a switch circuit SW21, a switch circuit SW22 and a switch circuit SW23. A first terminal and a second terminal of the switch circuit SW21 are respectively coupled to the host interface circuit 120 and the USB hub controller 130. A first terminal and a second terminal of the switch circuit SW22 are respectively coupled to the USB hub controller 130 and the USB physical layer circuit 140. A first terminal and a second terminal of the switch circuit SW23 are respectively coupled to the host interface circuit 120 and the USB physical layer circuit 140. When the BMC 100 operates in the internal bus mode, the switch circuit SW21 is turned on, and the switch circuits SW22 and SW23 are turned off. When the BMC 100 operates in the USB device mode, the switch circuit SW22 is turned on, and the switch circuits SW21 and SW23 are turned off. When the BMC 100 operates in the USB host mode, the switch circuit SW23 is turned on, and the switch circuits SW21 and SW22 are turned off.

Figure 3:
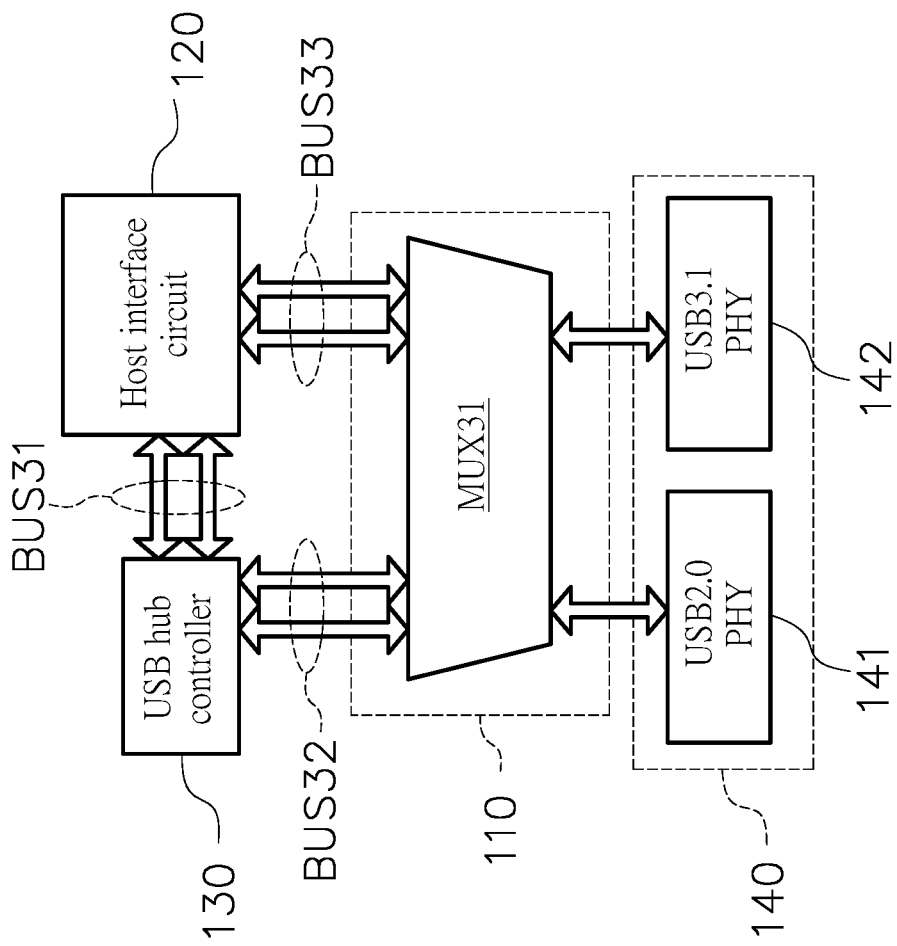
FIG. 3 is a schematic circuit diagram of a path switching circuit according to another embodiment of the invention.

FIG. 3 is a schematic circuit diagram of the path switching circuit 110 according to another embodiment of the invention. In the embodiment shown in FIG. 3, the path switching circuit 110 includes a multiplexer circuit MUX31, and the USB physical layer circuit 140 includes a USB2.0 physical layer circuit 141 conforming to a USB2.0 specification and a USB3.1 physical layer circuit 142 conforming to a USB3.1 specification. It should be noted that the USB3.1 physical layer circuit 142 is only an example. Based on an actual design, in other embodiments, the USB3.1 physical layer circuit 142 may be any USB physical layer circuit that conforms to USB3.0 or above, such as a USB3.0 physical layer circuit conforming to a USB3.0 specification, a USB3.2 physical layer circuit conforming to a USB3.2 specification, a USB4 physical layer circuit conforming to a USB4 specification, or other USB physical layer circuits. When the BMC 100 operates in the internal bus mode, the path switching circuit 110 may provide an internal bus BUS31 between the host interface circuit 120 and the USB hub controller 130, so that the USB hub controller 130 may provide the USB hub function to the host circuit 10 through the path switching circuit 110 and the host interface circuit 120. For example, the internal bus BUS31 may include a bus conforming to a USB2 specification and a bus conforming to a USB3 specification.

When the BMC 100 operates in the USB device mode, the path switching circuit 110 may provide a USB bus BUS32 between the USB hub controller 130 and the USB physical layer circuit 140. For example, the USB bus BUS32 may include a bus conforming to the USB2 specification and a bus conforming to the USB3 specification. In this case, the USB hub controller 130 may provide a USB2.0 hub function to the external USB host 20 through the multiplexer circuit MUX31 and the USB2.0 physical layer circuit 141, and/or the USB hub controller 130 may provide a USB3.1 hub function (or any USB hub function conforming to the USB3.0 or higher) to the external USB host 20 through the multiplexer circuit MUX 31 and the USB3.1 physical layer circuit 142 (or any USB physical layer circuit conforming to USB3.0 or higher).

When the BMC 100 operates in the USB host mode, the path switching circuit 110 may provide a USB bus BUS33 between the host interface circuit 120 and the USB physical layer circuit 140. For example, the USB bus BUS33 may include a bus conforming to the USB2 specification and a bus conforming to the USB3 specification. In this case, the host interface circuit 120 may provide a USB2.0 host function to the external USB device 20 through the multiplexer circuit MUX31 and the USB2.0 physical layer circuit 141, and/or the host interface circuit 120 may provide a USB3.1 host function (or any USB host function conforming to the USB3.0 or higher) to the external USB device 20 through the multiplexer circuit MUX 31 and the USB3.1 physical layer circuit 142 (or any USB physical layer circuit conforming to USB3.0 or higher).

Figure 4:
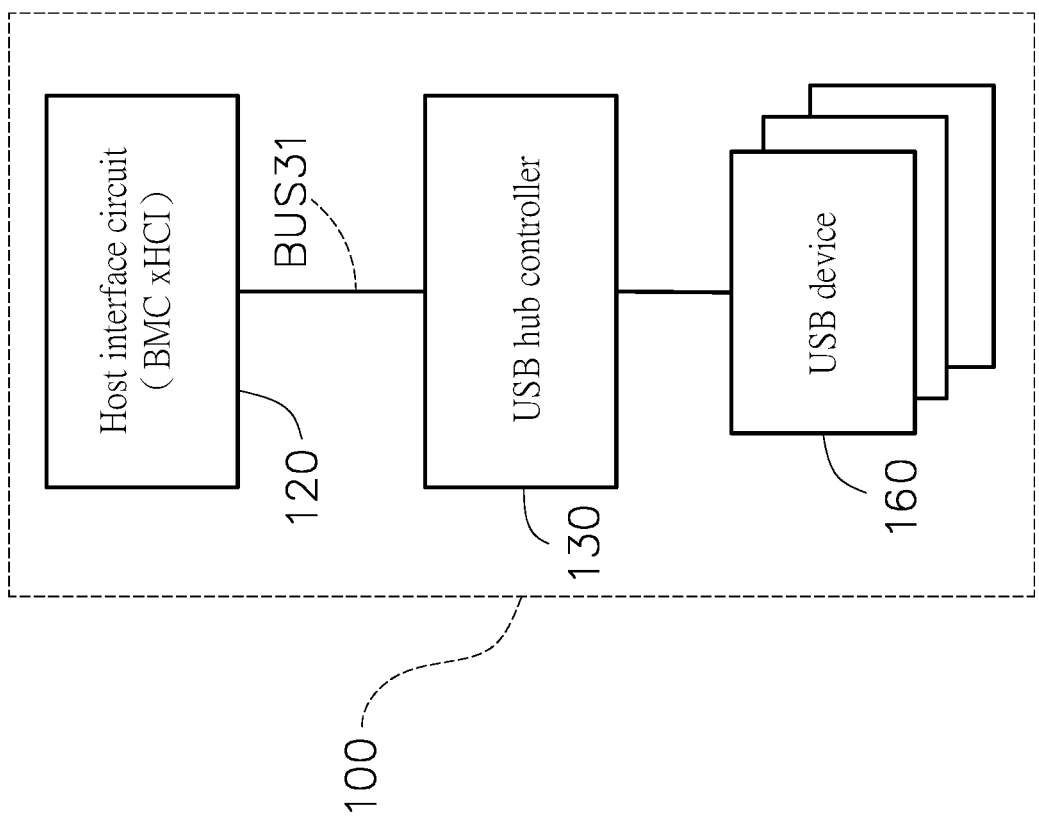
FIG. 4 is a schematic diagram illustrating a configuration example of the BMC according to an embodiment of the invention.

FIG. 4 is a schematic diagram illustrating a configuration example of the BMC 100 according to an embodiment of the invention. The configuration example shown in FIG. 4 assumes that the control circuit 150 controls the host interface circuit 120 to selectively operate in the BMC xHCI mode, and the control circuit 150 controls the path switching circuit 110 to provide the internal bus BUS31 between the host interface circuit 120 and the USB hub controller 130. In this case, the USB hub controller 130 may provide the USB hub function to the host interface circuit 120. Namely, the host interface circuit 120 serving as a USB host may use resources of the USB device 160 through the USB hub controller 130.

Figure 5:
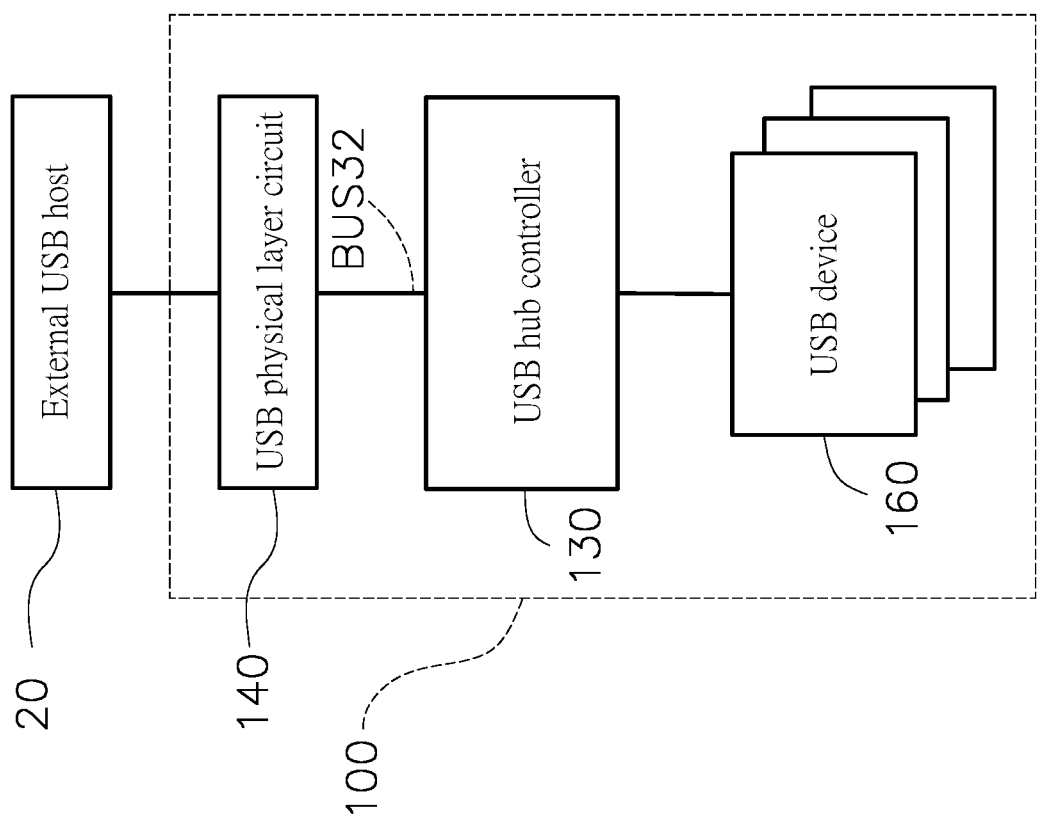
FIG. 5 is a schematic diagram illustrating another configuration example of the BMC according to an embodiment of the invention.

FIG. 5 is a schematic diagram illustrating another configuration example of the BMC 100 according to an embodiment of the invention. The configuration example shown in FIG. 5 assumes that the control circuit 150 controls the host interface circuit 120 to selectively operate in the BMC xHCI mode, and the control circuit 150 controls the path switching circuit 110 to provide the USB bus BUS32 between the USB hub controller 130 and the USB physical layer circuit 140. In this case, the USB hub controller 130 may provide the USB hub function to the external USB host 20 through the USB physical layer circuit 140. Namely, the external USB host 20 may use the resources of the USB device 160 through the USB physical layer circuit 140 and the USB hub controller 130.

Figure 6:
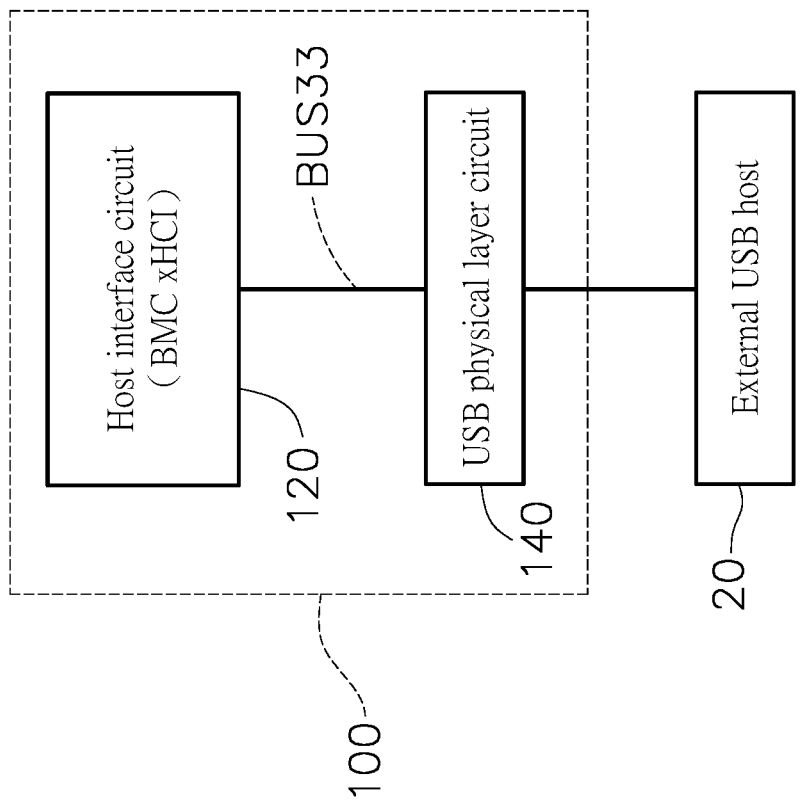
FIG. 6 is a schematic diagram illustrating still another configuration example of the BMC according to an embodiment of the invention.

FIG. 6 is a schematic diagram illustrating still another configuration example of the BMC 100 according to an embodiment of the invention. The configuration example shown in FIG. 6 assumes that the control circuit 150 controls the host interface circuit 120 to selectively operate in the BMC xHCI mode, and the control circuit 150 controls the path switching circuit 110 to provide the USB bus BUS33 between the host interface circuit 120 and the USB physical layer circuits 140. In this case, the host interface circuit 120 may provide the USB host function to the external USB device 20 through the USB physical layer circuit 140. Namely, the host interface circuit 120 serving as the USB host may use resources of the external USB device 20 through the USB physical layer circuit 140.

Figure 7:
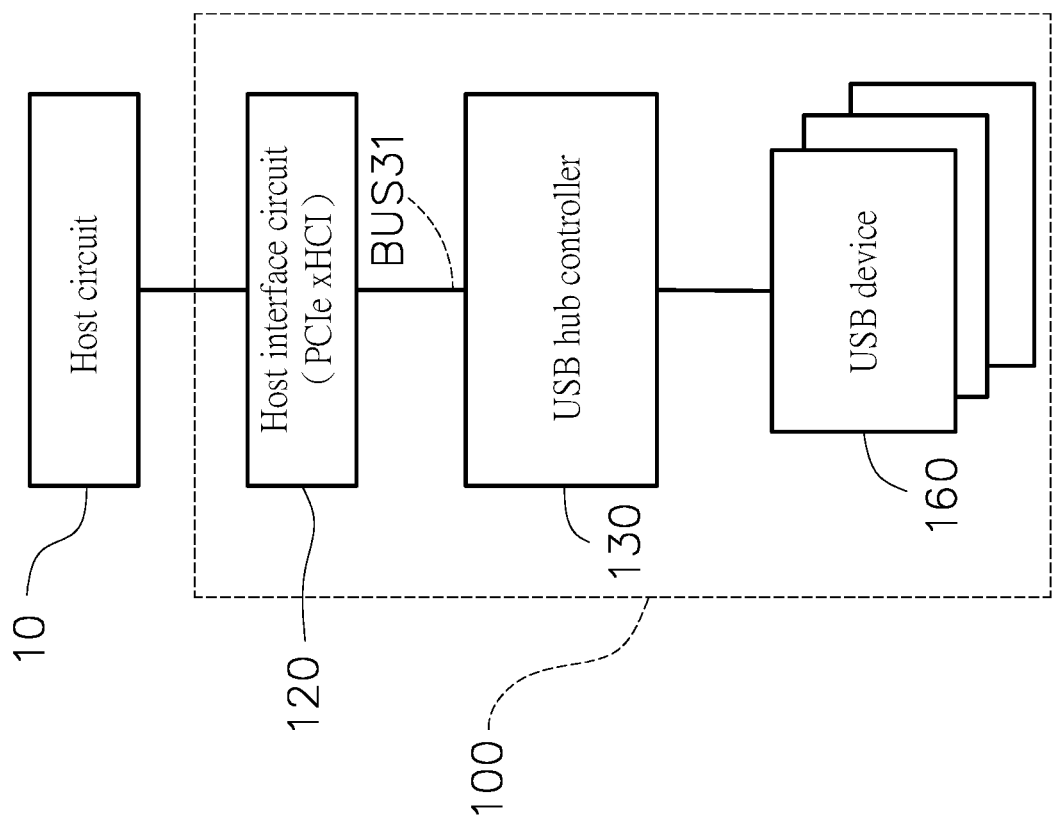
FIG. 7 is a schematic diagram illustrating yet another configuration example of the BMC according to an embodiment of the invention.

FIG. 7 is a schematic diagram illustrating yet another configuration example of the BMC 100 according to an embodiment of the invention. The configuration example shown in FIG. 7 assumes that the control circuit 150 controls the host interface circuit 120 to selectively operate in the PCIe xHCI mode, and the control circuit 150 controls the path switching circuit 110 to provide the internal bus BUS31 between the host interface circuit 120 and the USB hub controller 130. In this case, the USB hub controller 130 may provide the USB hub function to the host circuit 10 through the host interface circuit 120. Namely, the host circuit 10 serving as the USB host may use the resources of the USB device 160 through the host interface circuit 120 and the USB hub controller 130.

Figure 8:
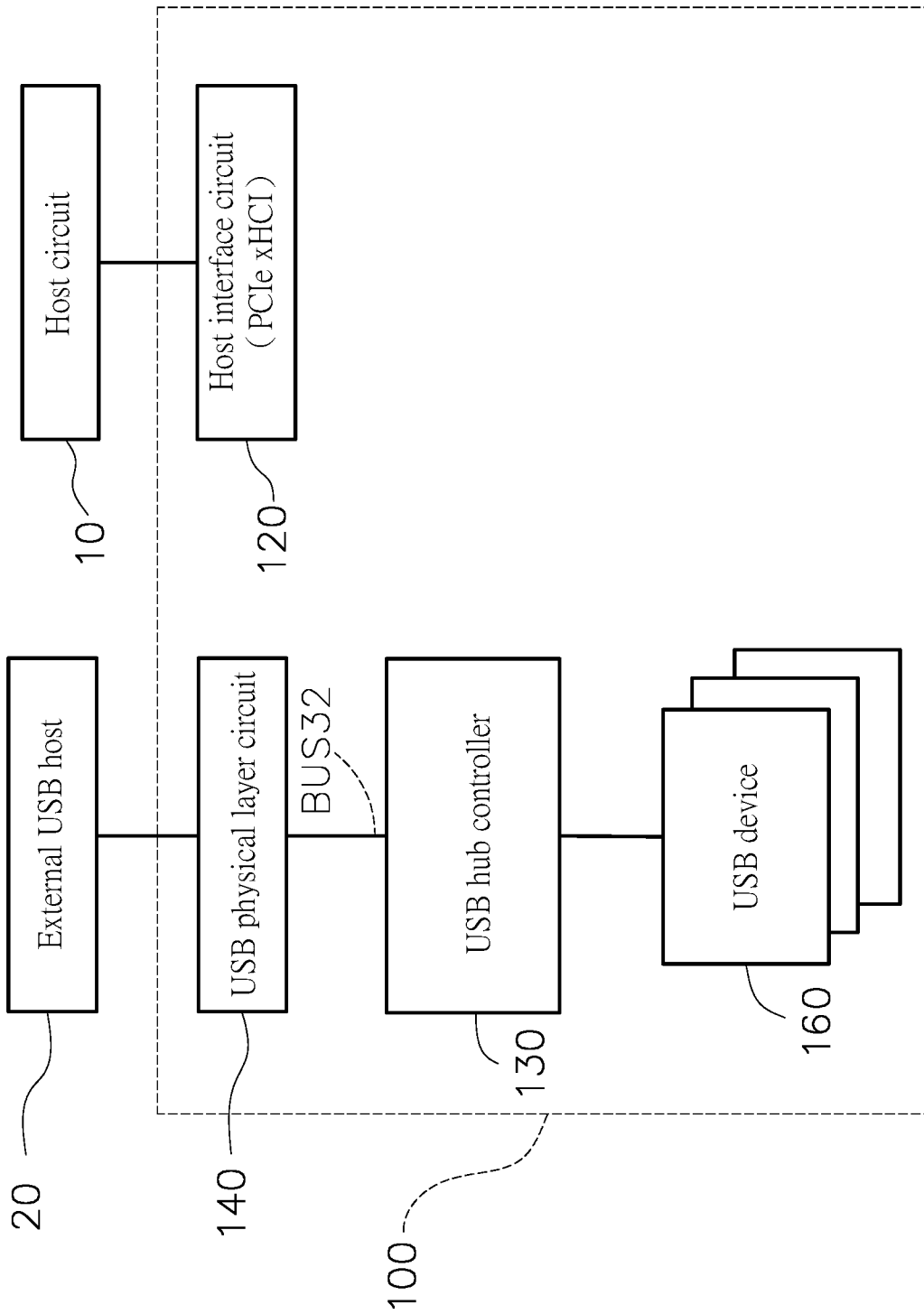
FIG. 8 is a schematic diagram illustrating still another configuration example of the BMC according to an embodiment of the invention.

FIG. 8 is a schematic diagram illustrating still another configuration example of the BMC 100 according to an embodiment of the invention. The configuration example shown in FIG. 8 assumes that the control circuit 150 controls the host interface circuit 120 to selectively operate in the PCIe xHCI mode, and the control circuit 150 controls the path switching circuit 110 to provide the USB bus BUS32 between the USB hub controller 130 and the USB physical layer circuit 140. In this case, the host circuit 10 may control the host interface circuit 120 through the PCIe bus, and the USB hub controller 130 may provide the USB hub function to the external USB host 20 through the USB physical layer circuit 140. Namely, the external USB host 20 may use the resources of the USB device 160 through the USB physical layer circuit 140 and the USB hub controller 130.

Figure 9:
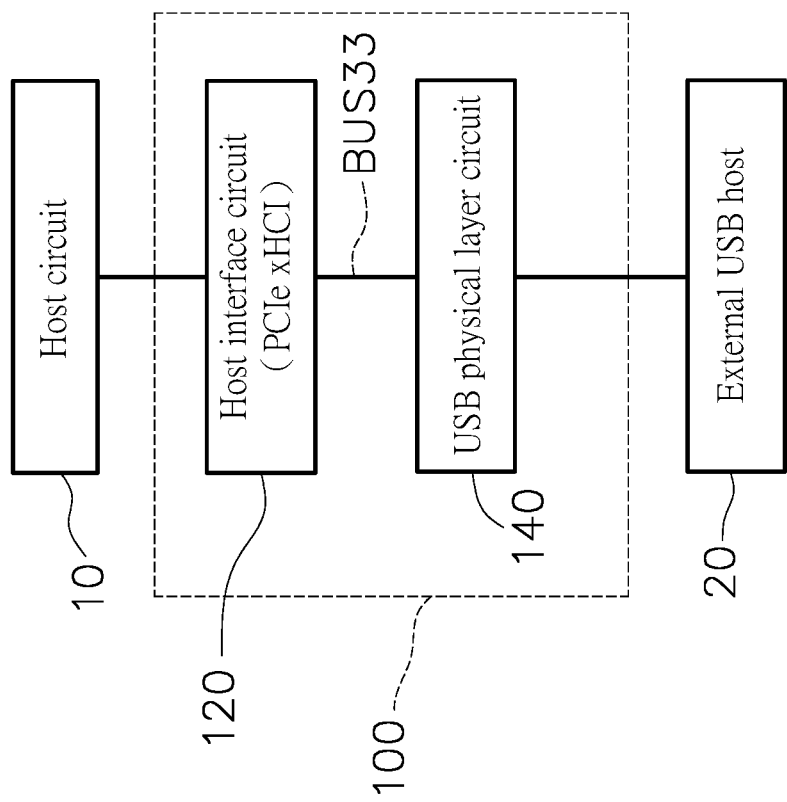
FIG. 9 is a schematic diagram illustrating still another configuration example of the BMC according to an embodiment of the invention.

FIG. 9 is a schematic diagram illustrating still another configuration example of the BMC 100 according to an embodiment of the invention. The configuration example shown in FIG. 9 assumes that the control circuit 150 controls the host interface circuit 120 to selectively operate in the PCIe xHCI mode, and the control circuit 150 controls the path switching circuit 110 to provide the USB bus BUS33 between the host interface circuit 120 and the physical layer circuit 140. In this case, the host interface circuit 120 may provide the USB host function to the external USB device 20 through the USB physical layer circuit 140. Namely, the host circuit 10 serving as the USB host may use the resources of the external USB device 20 through the host interface circuit 120 and the USB physical layer circuit 140.

Figure 10:
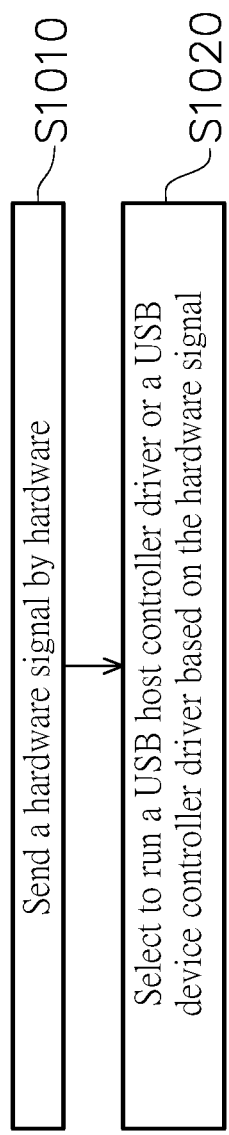
FIG. 10 is a schematic flowchart of an operation method of the BMC according to an embodiment of the invention.

FIG. 10 is a schematic flowchart of an operation method of the BMC 100 according to an embodiment of the invention. Referring to FIG. 1 and FIG. 10, in step S1010, hardware sends a hardware signal CS (for example, an ID pin signal) to the BMC 100. In step S1020, the control circuit 150 of the BMC 100 may choose to run a USB host controller driver or a USB device controller driver based on the hardware signal CS. When the control circuit 150 runs the USB host controller driver, the BMC 100 has a USB host controller function. At this time, the BMC 100 serving as the USB host may use the resources of the external USB device 20. When the control circuit 150 runs the USB device controller driver, the BMC 100 has a USB device controller function. At this time, the external USB host 20 may use the resources of the USB device 160 of the BMC 100.

Figure 11:
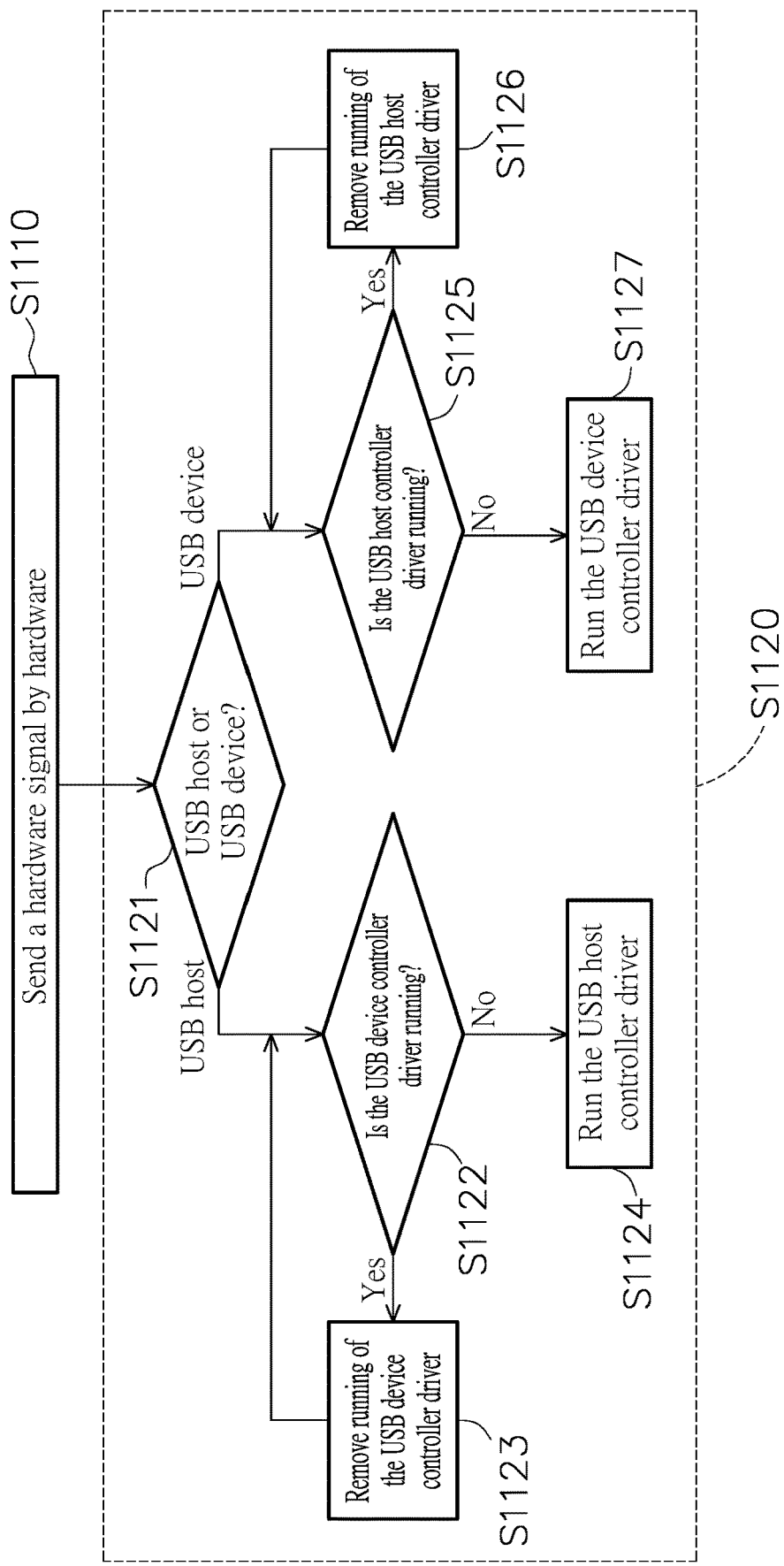
FIG. 11 is a schematic flowchart of an operation method of the BMC according to another embodiment of the invention.

FIG. 11 is a schematic flowchart of an operation method of the BMC 100 according to another embodiment of the invention. For steps S1110 and S1120 shown in FIG. 11, reference may be made to the related descriptions of steps S1010 and S1020 shown in FIG. 10, and thus details thereof are not repeated. In the embodiment shown in FIG. 11, step S1120 includes steps S1121, S1122, S1123, S1124, S1125, S1126 and S1127. Referring to FIG. 1 and FIG. 11, in step S1121, the control circuit 150 may determine whether the configuration of the BMC 100 should be a "USB host" configuration or a "USB device" configuration based on the hardware signal CS.

When the hardware signal CS indicates "USB host" (i.e., the determination result in step S1121 is "USB host"), the control circuit 150 may perform step S1122 to determine whether the control circuit 150 is currently running the USB device controller driver. When the USB device controller driver is running (i.e., the determination result of step S1122 is "Yes"), the control circuit 150 may perform step S1123 to remove the running of the USB device controller driver. For example, the operation of step S1123 may include clearing content of a shared register and/or other operations. Step S1123 may clear any operating data of the USB device controller driver to stop the running of the USB device controller driver. After step S1123 is completed, the control circuit 150 may return to step S1122. When the USB device controller driver is not running (i.e., the determination result of step S1122 is "No"), the control circuit 150 may perform step S1124 to run the USB host controller driver. In this way, the driver run by the control circuit 150 may be switched from the USB device controller driver to the USB host controller driver.

When the hardware signal CS indicates "USB device" (i.e., the determination result in step S1121 is "USB device"), the control circuit 150 may perform step S1125 to determine whether the control circuit 150 is currently running the USB host controller driver. When the USB host controller driver is running (i.e., the determination result of step S1125 is "Yes"), the control circuit 150 may perform step S1126 to remove the running of the USB host controller driver. For example, the operation of step S1126 may include clearing the content of the shared register and/or other operations to clear any operating data of the USB host controller driver, thereby stopping the running of the USB host controller driver. After step S1126 is completed, the control circuit 150 may return to step S1125. When the USB host controller driver is not running (i.e., the determination result of step S1125 is "No"), the control circuit 150 may perform step S1127 to run the USB device controller driver. In this way, the driver run by the control circuit 150 may be switched from the USB host controller driver to the USB device controller driver.

In summary, the BMC 100 according to the embodiments of the invention is configured with the host interface circuit 120, the USB hub controller 130, and the USB physical layer circuit 140. The path switching circuit 110 may flexibly switch routes among the host interface circuit 120, the USB hub controller 130 and the USB physical layer circuit 140. For example, the path switching circuit 110 may selectively provide the internal bus BUS31 between the host interface circuit 120 and the USB hub controller 130, so that the USB hub controller 130 may provide the USB hub function to the external host circuit 10 (for example, CPU) through the host interface circuit 120; the path switching circuit 110 may selectively provide the USB bus BUS32 between the USB hub controller 130 and the USB physical layer circuit 140, so that the USB hub controller 130 provides the USB hub function to the external USB host 20 through the USB physical layer circuit 140; and the path switching circuit 110 may selectively provide the USB bus BUS33 between the host interface circuit 120 and the USB physical layer circuit 140, so that the host interface circuit 120 provides the USB host function to the external USB device 20 through the USB physical layer circuit 140. Therefore, the BMC 100 may be flexibly switched to different configurations to adapt to different application environments.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A baseboard management controller, comprising:
   a path switching circuit;
   a host interface circuit, coupled to the path switching circuit, wherein the host interface circuit is adapted to be electrically connected to a host circuit outside the baseboard management controller;
   a universal serial bus (USB) hub controller, coupled to the path switching circuit;
   a USB physical layer circuit, coupled to the path switching circuit, wherein the USB physical layer circuit is adapted to be electrically connected to an external USB host or an external USB device outside the baseboard management controller; and
   a control circuit, configured to control the path switching circuit to selectively couple the host interface circuit to the USB hub controller, selectively couple the USB hub controller to the USB physical layer circuit, or selectively couple the host interface circuit to the USB physical layer circuit;
   wherein the path switching circuit comprises:
   a first switch circuit, having a first terminal and a second terminal respectively coupled to the host interface circuit and the USB hub controller, wherein the first switch circuit is turned on when the baseboard management controller operates in an internal bus mode;
   a second switch circuit, having a first terminal and a second terminal respectively coupled to the USB hub controller and the USB physical layer circuit, wherein the second switch circuit is turned on when the baseboard management controller operates in a USB device mode; and
   a third switch circuit, having a first terminal and a second terminal respectively coupled to the host interface circuit and the USB physical layer circuit, wherein the third switch circuit is turned on when the baseboard management controller operates in a USB host mode.

2. The baseboard management controller according to claim 1, further comprising:
   at least one USB device, coupled to the USB hub controller.

3. The baseboard management controller according to claim 1, wherein when the baseboard management controller operates in the internal bus mode, the control circuit controls the path switching circuit to provide an internal bus between the host interface circuit and the USB hub controller, so that the USB hub controller provides a USB hub function to the host circuit through the host interface circuit.

4. The baseboard management controller according to claim 1, wherein when the baseboard management controller operates in the USB device mode, the control circuit controls the path switching circuit to provide a USB bus between the USB hub controller and the USB physical layer circuit, so that the USB hub controller provides a USB hub function to the external USB host through the USB physical layer circuit.

5. The baseboard management controller according to claim 1, wherein when the baseboard management controller operates in the USB host mode, the control circuit controls the path switching circuit to provide a USB bus between the host interface circuit and the USB physical layer circuit, so that the host interface circuit provides a USB host function to the external USB device through the USB physical layer circuit.

6. The baseboard management controller according to claim 1, wherein the host interface circuit comprises an extensible host controller interface, and the host interface circuit is adapted to be electrically connected to the host circuit through a peripheral component interconnect express bus.

7. The baseboard management controller according to claim 1, wherein
   the control circuit selects to run a USB host controller driver or a USB device controller driver based on a hardware signal;
   when the control circuit runs the USB host controller driver, the baseboard management controller has a USB host controller function; and
   when the control circuit runs the USB device controller driver, the baseboard management controller has a USB device controller function.

8. The baseboard management controller according to claim 7, wherein
   when the hardware signal indicates "USB device", the control circuit determines whether the USB host controller driver is running;
   when the hardware signal indicates "USB device", and the USB host controller driver is running, the control circuit removes the running of the USB host controller driver; and
   when the hardware signal indicates "USB device", and the USB host controller driver is not running, the control circuit runs the USB device controller driver.

9. An operation method of a baseboard management controller, comprising:
   electrically connecting a USB physical layer circuit of the baseboard management controller to an external USB host or an external USB device external to the baseboard management controller;
   selecting to run a USB host controller driver or a USB device controller driver by a control circuit of the baseboard management controller based on a hardware signal, wherein
   when the control circuit runs the USB host controller driver, the baseboard management controller has a USB host controller function;

when the control circuit runs the USB device controller driver, the baseboard management controller has a USB device controller function;

controlling, by the control circuit, a path switching circuit of the baseboard management controller to selectively couple a host interface circuit of the baseboard management controller to a USB hub controller of the baseboard management controller, selectively couple the USB hub controller to the USB physical layer circuit, or selectively couple the host interface circuit to the USB physical layer circuit, wherein the path switching circuit is configured to:

turning on a first switch circuit of the path switching circuit when the baseboard management controller operates in an internal bus mode, wherein a first terminal and a second terminal of the first switch circuit are respectively coupled to the host interface circuit and the USB hub controller;

turning on a second switch circuit of the path switching circuit when the baseboard management controller operates in a USB device mode, wherein a first terminal and a second terminal of the second switch circuit are respectively coupled to the USB hub controller and the USB physical layer circuit; and turning on a third switching circuit of the path switching circuit when the baseboard management controller operates in a USB host mode, wherein a first terminal and a second terminal of the third switch circuit are respectively coupled to the host interface circuit and the USB physical layer circuit.

10. The operation method according to claim 9, further comprising:

when the hardware signal indicates "USB host", determining whether the USB device controller driver is running by the control circuit;

when the hardware signal indicates "USB host", and the USB device controller driver is running, removing the running of the USB device controller driver by the control circuit; and when the hardware signal indicates "USB host", and the USB device controller driver is not running, running the USB host controller driver by the control circuit.

11. The operation method according to claim 9, further comprising:

when the hardware signal indicates "USB device", determining whether the USB host controller driver is running by the control circuit;

when the hardware signal indicates "USB device", and the USB host controller driver is running, removing the running of the USB host controller driver by the control circuit; and when the hardware signal indicates "USB device", and the USB host controller driver is not running, running the USB device controller driver by the control circuit.

12. The baseboard management controller according to claim 7, wherein when the hardware signal indicates "USB host", the control circuit determines whether the USB device controller driver is running;

when the hardware signal indicates "USB host", and the USB device controller driver is running, the control circuit removes the running of the USB device controller driver; and when the hardware signal indicates "USB host", and the USB device controller driver is not running, the control circuit runs the USB host controller driver.

\* \* \* \* \*